(12) United States Patent
Shionoiri

(10) Patent No.: US 8,331,873 B2
(45) Date of Patent: Dec. 11, 2012

(54) SEMICONDUCTOR DEVICE

(75) Inventor: Yutaka Shionoiri, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 954 days.

(21) Appl. No.: 12/073,615

(22) Filed: Mar. 7, 2008

(65) Prior Publication Data

US 2008/0230821 A1 Sep. 25, 2008

(30) Foreign Application Priority Data

Mar. 22, 2007 (JP) ................................ 2007-074085

(51) Int. Cl.
*H04Q 7/00* (2006.01)
*H04B 1/38* (2006.01)

(52) U.S. Cl. ........... 455/73; 455/69; 455/41.1; 455/129; 455/403; 455/38.3; 455/127; 455/343; 340/825.54; 340/825.34; 340/825.31; 340/572; 340/426; 340/825.69; 340/825.72

(58) Field of Classification Search ................. 455/41.1, 455/41.2, 39, 205, 31.3; 327/142, 143, 160, 327/291, 294, 299; 343/795, 802, 803, 804, 343/806; 323/312, 282, 273, 223, 266
See application file for complete search history.

(56) References Cited

U.S. PATENT DOCUMENTS

| | | | |
|---|---|---|---|
| 5,804,997 A * | 9/1998 | Nishizono et al. ............ | 327/103 |
| 5,847,662 A * | 12/1998 | Yokota et al. ............. | 340/10.34 |
| 6,134,130 A * | 10/2000 | Connell et al. ................. | 363/89 |
| 6,750,560 B1 | 6/2004 | Nishimoto et al. | |
| 6,954,053 B2 * | 10/2005 | Gay ............................... | 323/273 |
| 6,975,164 B1 * | 12/2005 | Matsui et al. ................. | 327/541 |
| 7,026,824 B2 * | 4/2006 | Chen ............................ | 324/541 |
| 7,088,246 B2 | 8/2006 | Fukuoka | |
| 2002/0093316 A1 * | 7/2002 | Fahrenbruch ................ | 323/273 |
| 2004/0008013 A1 | 1/2004 | Gay | |
| 2004/0065733 A1 | 4/2004 | Fukuoka | |
| 2006/0029250 A1 | 2/2006 | Karaki | |
| 2006/0267769 A1 | 11/2006 | Ito et al. | |

(Continued)

FOREIGN PATENT DOCUMENTS

EP 1 387 313 2/2004

(Continued)

OTHER PUBLICATIONS

International Search Report (Application No. 08004115.5) dated Jul. 8, 2008.

*Primary Examiner* — Matthew Anderson
*Assistant Examiner* — Ganiyu A Hanidu
(74) *Attorney, Agent, or Firm* — Eric J. Robinson; Robinson Intellectual Property Law Office, P.C.

(57) ABSTRACT

In a semiconductor device which can perform data communication through wireless communication, to suppress transmission and the like of an AC signal, the semiconductor device includes an input circuit to which a radio signal is input, a first circuit, which generates a constant voltage, such as a constant voltage circuit or a limiter circuit, a second circuit to which the generated constant voltage is input and which can change impedance of the semiconductor device, and a filter provided between the first circuit and the second circuit. Transmission of an AC signal is suppressed by the filter, and malfunctions or operation defects such as complete inoperative due to variation in the constant voltage is prevented.

13 Claims, 12 Drawing Sheets

U.S. PATENT DOCUMENTS

| | | |
|---|---|---|
| 2007/0268207 A1 | 11/2007 | Karaki |
| 2007/0285347 A1 | 12/2007 | Karaki |
| 2007/0290207 A1 | 12/2007 | Atsumi et al. |
| 2008/0180080 A1* | 7/2008 | Terry et al. .................. 323/288 |

FOREIGN PATENT DOCUMENTS

| | | |
|---|---|---|
| JP | 11-088243 | 3/1999 |
| JP | 11-215026 | 8/1999 |
| JP | 2002-368647 | 12/2002 |
| JP | 2005-092352 | 4/2005 |
| JP | 2005-234827 | 9/2005 |
| JP | 2006-047671 | 2/2006 |
| JP | 2007-514400 | 5/2007 |
| WO | WO-02/07173 | 1/2002 |
| WO | WO 2004/006038 | 1/2004 |
| WO | WO 2006/101285 | 9/2006 |
| WO | WO 2006/137573 | 12/2006 |

* cited by examiner

SEMICONDUCTOR DEVICE

BACKGROUND OF THE INVENTION

1. Field of the Invention

The present invention relates to a semiconductor device which is capable of data communication (reception/sending) through wireless communication.

2. Description of the Related Art

Recently, an individual identification technique using wireless communication (hereinafter referred to as a wireless communication system) has attracted attention. Specifically, RFID tags (also referred to as IC tags, IC chips, RF tags, wireless tags, or electronic tags) have begun to be used for production, management, and the like of individual objects. In addition, the RFID tags are expected to be used for personal authentification.

The wireless communication system is a system which performs data communication using radio signals between a power supply-cum-sender/receiver or a sender/receiver such as a communication device (also referred to as an interrogator or a reader/writer), and a sender/receiver such as an RFID tag (hereinafter referred to as an RFID tag).

As for the wireless communication system, research and development for improving efficiency of power supply from a communication device to an RFID tag have been actively conducted in order to extend a communication distance between the communication device and the RFID tag.

In general, electric power is in inversely proportional to the square of the distance between a spot where the electric power is emitted and a spot where the electric power is observed. Therefore, the longer the distance (hereinafter referred to as a communication distance) between the communication device and the RFID tag becomes, the less electric power the RFID tag receives, whereas the shorter the communication distance becomes, the more electric power the RFID tag receives.

When the communication distance is long and the RFID tag receives a small amount of electric power, power consumption of the RFID tag can be reduced as one of methods for performing normal communication. For reduction of power consumption of the RFID tag, a transistor which can drive at a low voltage has been increasingly used.

On the other hand, when the communication distance is short and the RFID tag receives a huge amount of electric power, Patent Document 1 (Japanese Published Patent Application No. 2002-368647) can be used as one of methods for performing normal communication.

SUMMARY OF THE INVENTION

According to Patent Document 1, output potential of a regulator or the like is input to a variable resistor connected to both ends of an antenna so that impedance of the RFID tag is changed; accordingly, normal communication can be performed without damaging elements included in the RFID tag even when a huge amount of electric power is received.

When a switching element such as the variable resistor is used, a constant voltage generated in a regulator or the like is influenced by an AC signal because of capacitance of the switching element. Therefore, the constant voltage varies. Hereinafter, a phenomenon in which a constant voltage varies due to the influence of the AC signal upon the constant voltage because of capacitance of the switching element such as the variable resistor is called transmission of an AC signal.

When transmission of the AC signal occurs, a voltage which is supposed to have a fixed potential varies and a circuit included in the RFID tag, which is driven by the voltage, a malfunction, or operation defects such as complete inoperative can be caused.

In view of the above-described problem, an object is to suppress a malfunction or the like caused by transmission of an AC signal in a semiconductor device which is capable of data communication (reception and sending) through wireless communication.

The present invention provides a semiconductor device having the structure described below to solve the above-described problems.

One feature of a semiconductor device of the present invention is to provide a filter between a circuit, which is configured to generate a constant voltage, such as a regulator, a constant voltage circuit, or a limiter circuit, and a circuit (hereinafter referred to as a feedback circuit) to which the generated constant voltage is input.

The feedback circuit is a circuit which can change impedance of a semiconductor device by receiving the generated constant voltage. Any element or circuit can be used as the feedback circuit as long as it can change impedance of a semiconductor. For example, an element such as a variable resistor or a variable capacitor can be given.

In a semiconductor device which is capable of data communication (reception and sending) through wireless communication, a filter is provided between the circuit, which is configured to generate constant voltage, such as a regulator, a constant voltage circuit, or a limiter circuit, and the circuit (hereinafter referred to as a feedback circuit) to which the generated constant voltage is input. By providing the filter, transmission of an AC signal can be suppressed. Accordingly, the constant voltage becomes less likely to vary so that a malfunction or an operation defects such as complete inoperative can be suppressed.

DETAILED DESCRIPTION OF THE INVENTION

Figure 1:
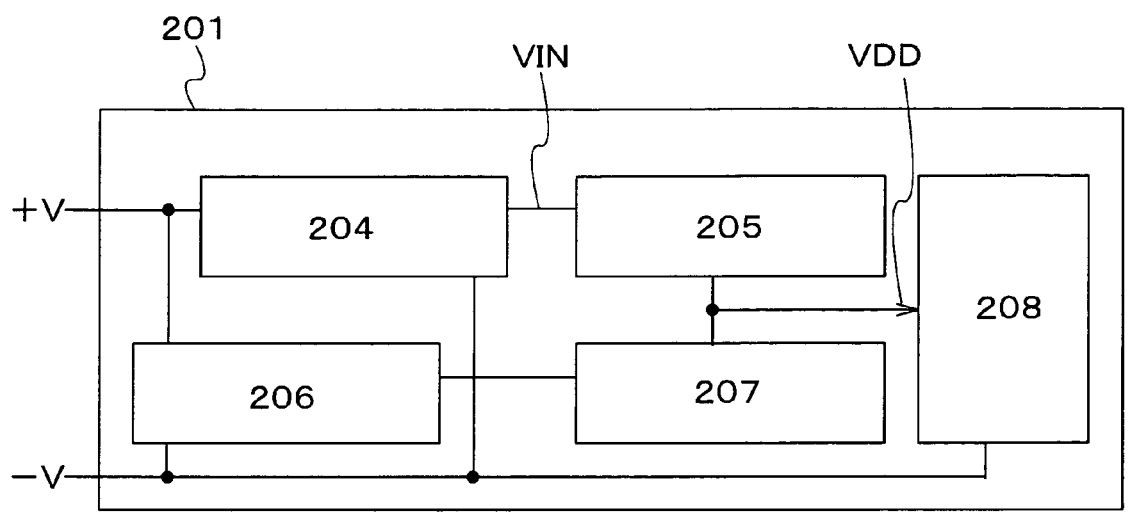
FIG. 1 illustrates Embodiment Mode 1 of the present invention.

Embodiment Modes of the present invention will be described in detail with reference to the accompanying drawings. It is to be noted that the present invention is not limited to the following description, and it is easily understood by those skilled in the art that modes and details thereof can be modified in various ways without departing from the spirit and the scope of the present invention. Therefore, the present invention should not be interpreted as being limited to the following description of the embodiment modes. In a structure of the present invention to be given below, reference numerals denoting the same portions are used in common in different drawings.

In addition, connection is equivalent to electrical connection in the present invention. Therefore, if an element 1 and element 2 are connected to each other, another element or the like can be provided therebetween.

[Embodiment Mode 1]

In Embodiment Mode 1, a structure of a semiconductor device of the present invention which is capable of data communication through wireless communication will be described.

As shown in FIG. 1, a semiconductor device 201 includes an input circuit 204, a circuit 205 which generates a constant voltage, a feedback circuit 206, a filter 207, and a circuit portion 208.

The input circuit 204 rectifies an input AC signal to generate a DC voltage. Any circuit configuration can be employed as long as the circuit rectifies an input signal to generate a DC voltage. For example, a circuit configuration is given in which a rectifier circuit such as a half-wave rectifier circuit or a full-wave rectifier circuit is combined with an element such as a capacitor element or a coil.

The circuit 205 generates a constant voltage which is lower than a DC voltage generated by the input circuit 204. Any circuit configuration can be employed as long as the circuit can keep a voltage constant which is generated by using either or both of a voltage and/or a current.

The feedback circuit 206 changes impedance of the semiconductor device 201 by using a constant voltage generated in the circuit 205, and prevents generation of strong power supply even if a high-intensity radio wave is received. Any circuit configuration can be employed as long as the circuit changes impedance of the semiconductor device 201. For example, a circuit configuration is given in which a switching element using one transistor is combined with a resistance element.

The filter 207 is provided between the circuit 205 and the feedback circuit 206, and suppresses transmission of the AC signal when the feedback circuit 206 is operating.

As a circuit configuration of the filter 207, a configuration in which a resistance element and a capacitor element are connected in series can be given. By adjusting the product of the resistance value of the resistance element and the capacitance value of the capacitor element, the frequency of the AC signal whose transmission is desired to be suppressed can be adjusted.

When the resistance element and the capacitor element are connected in series, the frequency (fc), the capacitance value (C), and the resistance value (R) are expressed by a formula, $fc < 1/(2\pi CR)$. This formula shows that a frequency lower than $1/(2\pi CR)$ is likely to pass through the filter while a frequency higher than $1/(2\pi CR)$ is less likely to pass through the filter. This formula can estimate the capacitance value (C) and the resistance value (R) in accordance with the frequency of the AC signal whose transmission is desired to be suppressed.

It can be found that CR is preferably smaller than $1.6 \times 10^{-7}$ in order to make a frequency that is higher than 1 MHz less likely to pass through the filter, by using the aforementioned formula, e. g., C=16 pF and R=10 kΩ.

By employing the above-described structure, the semiconductor device of the present invention can suppress transmission of the AC signal. Accordingly, the constant voltage is less likely to vary, so that a malfunction or an operation defect such as complete inoperative can be prevented.

[Embodiment Mode 2]

In Embodiment Mode 2, a structure and operation of a semiconductor device of the present invention when it is provided for an RFID tag will be described.

First, the structure will be described.

Figure 3:
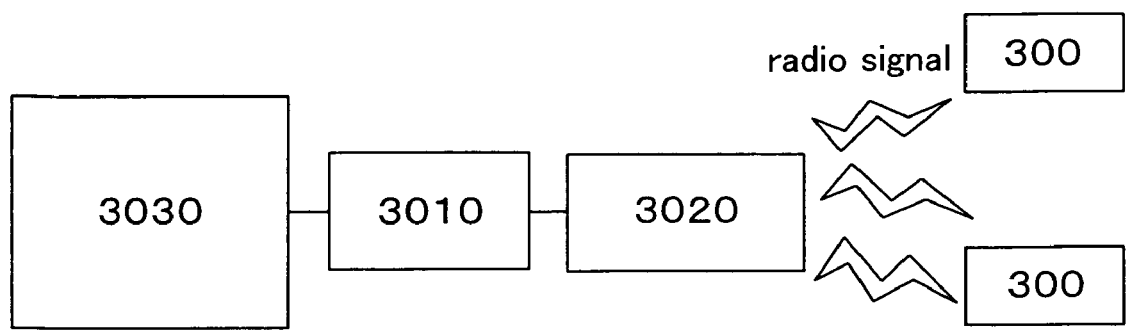
FIG. 3 illustrates Embodiment Mode 2 of the present invention.

A conceptual diagram of a wireless communication system is shown in FIG. 3. The wireless communication system mainly includes a communication device 3010, an antenna unit 3020 which is electrically connected to the communication device 3010, an RFID tag 300, and a controlling terminal 3030 which controls the communication device.

Figure 2:
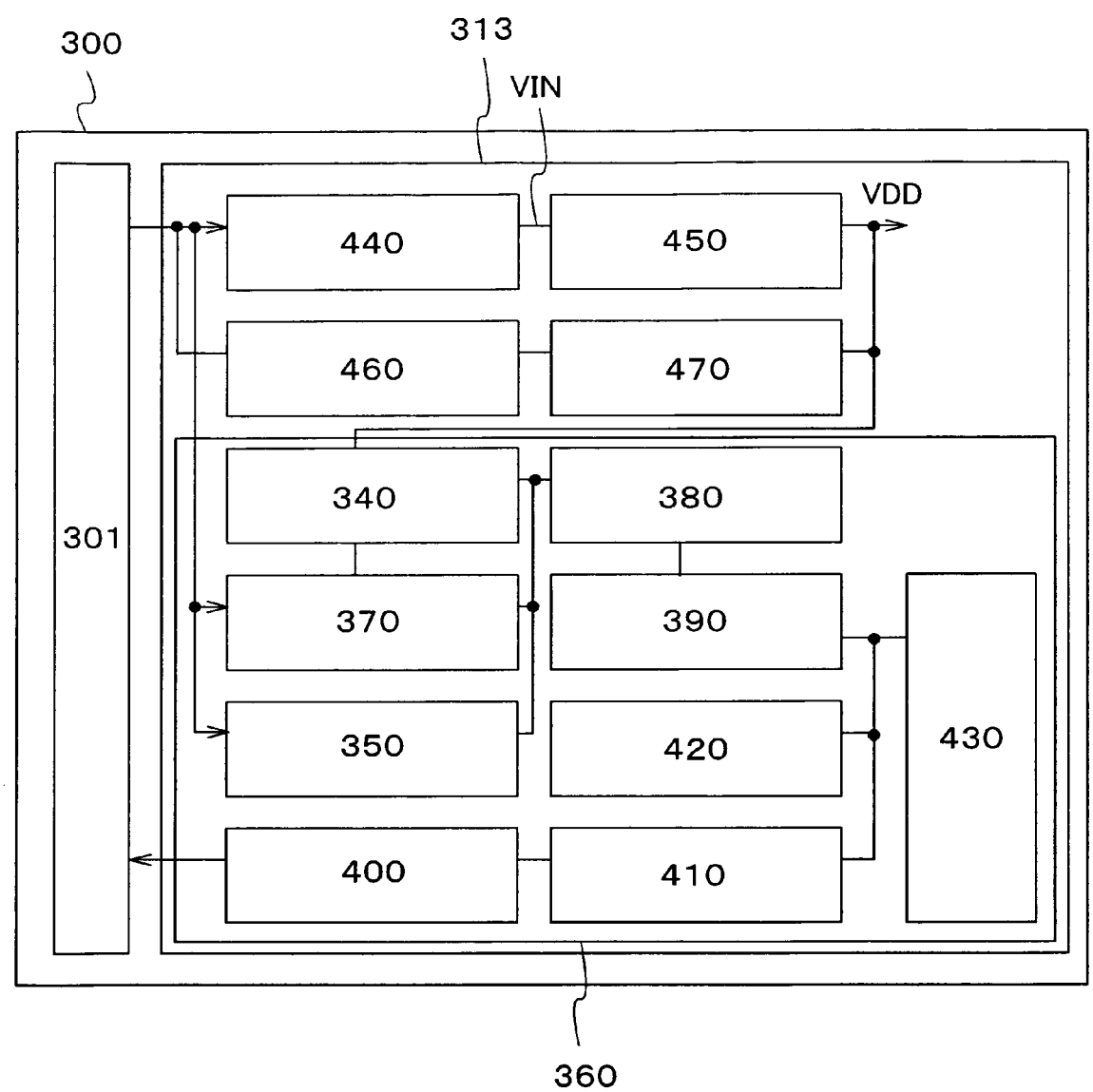
FIG. 2 illustrates Embodiment Mode 2 of the present invention.

A circuit configuration of the RFID tag 300 is shown in FIG. 2. The RFID tag 300 includes an antenna 301 and a semiconductor IC 313. Note that the antenna 301 is not necessarily included in the RFID tag 300 of the present invention. The semiconductor IC 313 includes an input circuit 440, a circuit 450 which generates a constant voltage, a feedback circuit 460, a filter 470 and a circuit portion 360, which are components of the semiconductor device of the present invention. The circuit portion 360 includes a reset circuit 340, a demodulation circuit 350, a clock generation circuit 370, a code extraction circuit 380, a code determination circuit 390, a modulation circuit 400, a signal output controlling circuit 410, a CRC (cyclic redundancy check) circuit 420, and a memory 430.

Next, operation will be described with reference to FIGS. 2 and 3.

A radio signal is sent from the antenna unit 3020 which is electrically connected to the communication device 3010. The radio signal includes a command from the communication device 3010 to the RFID tag 300. Then, the radio signal is received by the antenna 301 included in the RFID tag 300.

The radio signal received by the antenna 301 is sent as an AC signal, which is an electrical signal, to the input circuit 440. The input circuit 440 includes a rectifier circuit and a capacitor. The radio signal received is rectified by passing through the rectifier circuit and then smoothed by the capacitor. Then, a DC voltage (hereinafter also referred to as $V_{IN}$) is generated.

Although the capacitor is used when the $V_{IN}$ is generated, a coil or both of a coil and the capacitor can be used. A configuration of the input circuit 440 may be anything as long as the circuit can generate a DC voltage from a rectified signal.

The $V_{IN}$ is sent to the circuit 450 which generates a constant voltage, and the constant voltage (hereinafter also referred to as $V_{DD}$) is generated therein. The generated $V_{DD}$ is supplied to each circuit block. Note that low power supply potential ($V_{SS}$) is common in this embodiment mode.

The generated constant voltage $V_{DD}$ is input to the feedback circuit 460 through the filter 470. Even when the feedback circuit 460 operates and the AC signal is transmitted, the transmitted AC signal is less likely to pass through the filter 470. Therefore, variation in the constant voltage $V_{DD}$ by the AC signal is suppressed.

In addition, the radio signal received by the antenna 301 is also sent as the AC signal to the demodulation circuit 350. The demodulation circuit 350 rectifies and demodulates the signal.

The demodulated signal may be amplified by providing an analog amplifier next to the demodulation circuit 350. By amplifying the demodulated signal, a signal waveform becomes sharp. If the signal waveform has a gentle curve, delay of the signal is worsen and the operation becomes unstable. However, when the signal waveform has a sharp curve, delay of the signal is short and operation can be stable.

Further, the radio signal received by the antenna 301 is sent as the AC signal to the clock generation circuit 370. The clock generation circuit 370 divides the AC signal and generates a reference clock signal. The reference clock signal generated by the clock generation circuit 370 is sent to each circuit block and used for latch and selection of signals in each circuit block, time counting, and the like.

The demodulated signal and the reference clock signal are sent to the code extraction circuit 380. The code extraction circuit 380 extracts a command, that is from the communication device 3010 to the RFID tag 300, from the demodulated signal. In addition, the code extraction circuit 380 generates a signal which controls the code determination circuit 390.

The command extracted by the code extraction circuit 380 is sent to the code determination circuit 390. The code determination circuit 390 identifies the command from the communication device 3010. In addition, the code determination circuit 390 controls the CRC circuit 420, the memory 430, and the signal output controlling circuit 410.

In this manner, the command from the communication device 3010 is identified and the CRC circuit 420, the memory 430, and the signal output controlling circuit 410 are operated in accordance with the identified command. Then, a signal including unique data such as an ID number which is stored or written in the memory 430 is output, or data is stored in the memory 430.

The signal output controlling circuit 410 converts the signal including unique data such as an ID number which is stored or written in the memory 430 into an encoded signal by an encoding method meeting a standard such as ISO. In accordance with the encoded signal, the radio signal received by the antenna 301 is modulated by the modulation circuit 400.

The modulated signal is received by the antenna unit 3020 which is electrically connected to the communication device 3010. Then the received signal is analyzed in the communication device 3010 to recognize the unique data such as the ID number in the RFID tag 300 that uses the semiconductor device of the present invention.

By employing the above described structure, the semiconductor device of the present invention can suppress transmission of the AC signal. Accordingly, the constant voltage $V_{DD}$ is less likely to vary so that a malfunction or an operation defect such as complete inoperative can be prevented.

This embodiment mode can be implemented by being combined as appropriate with any of the above-described embodiment modes.

[Embodiment Mode 3]

Embodiment Mode 3 will describe a circuit configuration of a semiconductor device of the present invention.

Figure 4:
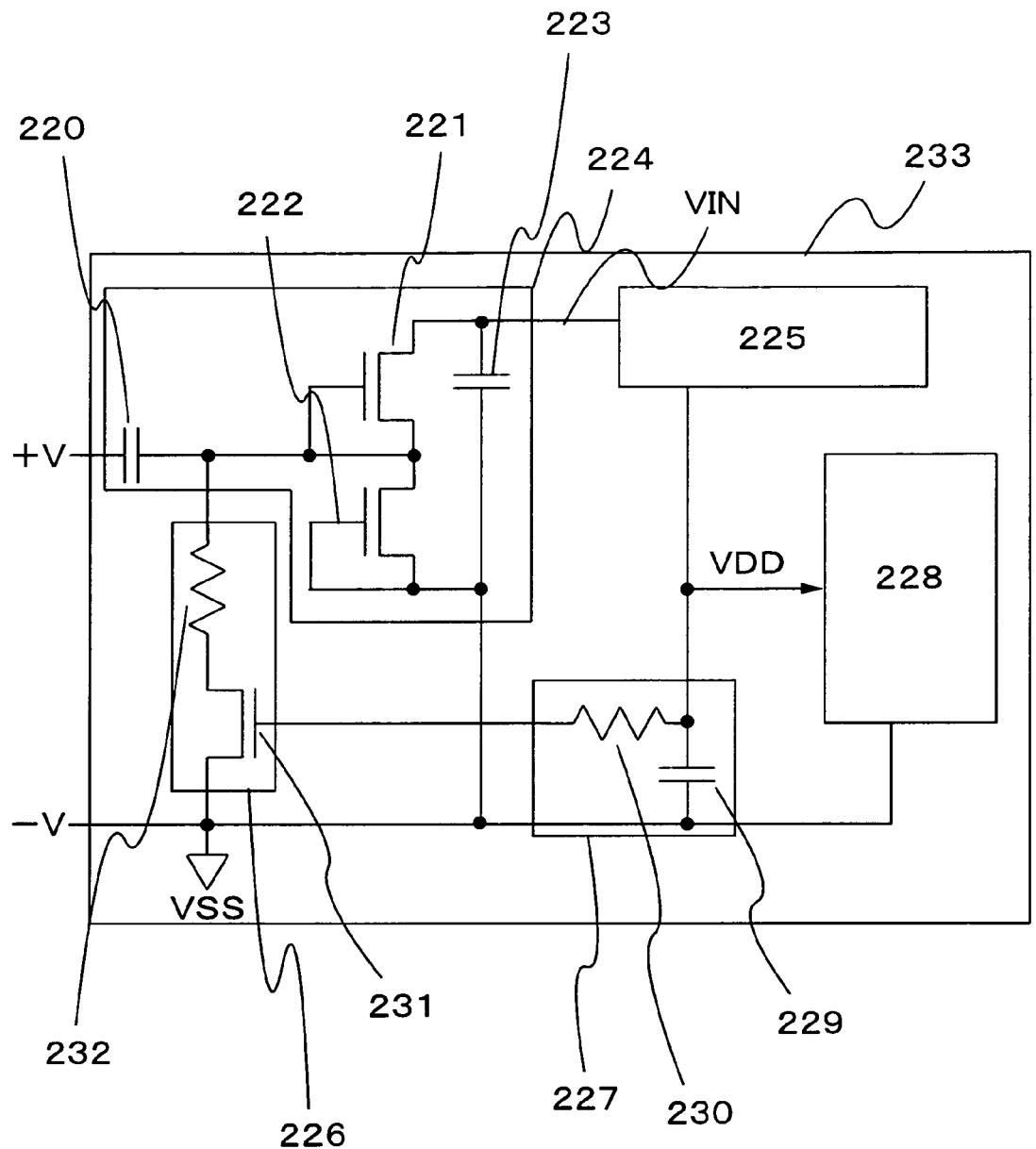
FIG. 4 illustrates Embodiment Mode 3 of the present invention.

FIG. 4 illustrates the circuit configuration. A semiconductor device 233 includes an input circuit 224, a circuit 225 which generates a constant voltage, a feedback circuit 226, a filter 227, and a circuit portion 228.

Two input terminals +V and −V of the semiconductor device 233 are electrically connected to a + terminal and a − terminal, respectively, of an element, which receives a radio signal, such as an antenna.

Note that both a voltage applied to the +V terminal and a voltage applied to the −V terminal are AC voltages. Hereinafter, a structure of the semiconductor device 233 will be specifically described with an example in which a voltage applied to the +V terminal is higher than that applied to the −V terminal.

The input circuit 224 includes a first capacitor element 220, a first transistor 221, a second transistor 222, and a second capacitor element 223. One terminal of the first capacitor element 220 is connected to the +V terminal, and the other terminal is connected to a gate terminal and a source terminal of the first transistor 221. The gate terminal and the source terminal of the first transistor 221 are connected to each other and the first transistor 221 functions as a diode. In addition, a drain terminal of the first transistor 221 is connected to one terminal of the second capacitor element 223. Similar to the first transistor 221, a gate terminal and a source terminal of the second transistor 222 are connected to each other and the second transistor 222 functions as a diode. Further, a drain terminal of the second transistor 222 is connected to the gate terminal and the source terminal of the first transistor 221. Furthermore, the gate terminal and the source terminal of the second transistor 222 are connected to the other terminal of the second capacitor element 223. Note that the other terminal of the second capacitor element 223 is also connected to the −V terminal. A half-wave voltage-doubling rectifier circuit is composed of the first capacitor element 220, the first transistor 221 and the second transistor 222.

The filter 227 includes a first resistance element 230 and a third capacitor element 229. One terminal of the first resistance element 230 is connected to one terminal of the third capacitor element 229 and an output of the circuit 225 which generates a constant voltage; and the other terminal of the first resistance element 230 is connected to a gate terminal of a third transistor 231 included in the feedback circuit 226. The other terminal of the third capacitor element 229 is connected to the −V terminal. Although the third capacitor element 229 is connected to the −V terminal and one terminal of the first resistance element 230 in FIG. 4, the third capacitor element 229 can be connected to the −V terminal and the other terminal of the first resistance element 230.

The feedback circuit 226 includes the third transistor 231 and a second resistance element 232. A source terminal of the third transistor 231 is connected to the −V terminal, the gate terminal is connected to the other terminal of the first resistance element 230 included in the filter 227, and a drain terminal is connected to one terminal of the second resistance element 232. The other terminal of the second resistance element 232 is connected to the other terminal of the first capacitor element 220 in the input circuit 224, and the gate terminal and the source terminal of the first transistor 221.

FIG. 4 illustrates an example of the feedback circuit 226 having the third transistor 231 and the second resistance element 232. However, the second resistance element 232 can be replaced with a capacitor element or a diode. The feedback circuit 226 may be any circuit as long as it changes impedance of the semiconductor device 233.

Note that when the voltage applied to the +V terminal is lower than that applied to the −V terminal, the source terminal and the drain terminal in each of the first transistor 221, the second transistor 222, and the third transistor 231 are exchanged with each other.

Operation of the semiconductor device 233 will be briefly described. A radio signal received by an antenna is input as an AC signal to the input circuit 224. The AC signal input to the input circuit 224 is rectified by the half-wave voltage-doubling rectifier circuit to generate a signal whose amplitude is approximately twice as large as the amplitude of a half-wave of the AC signal. Then, the generated signal is smoothed in the second capacitor element 223 to be a DC voltage (hereinafter also referred to as The generated $V_{IN}$ is input to the circuit 225 which generates a constant voltage and a constant voltage (hereinafter also referred to as $V_{DD}$) whose voltage is lower and more constant than $V_{IN}$ is generated. A circuit configuration may be anything as long as it can make the voltage constant which is generated by one or both of voltage and current. For example, a regulator circuit can be given.

The generated $V_{DD}$ is supplied to the circuit portion 228. Note that the $V_{DD}$ passes through the filter 227 which is provided between the circuit 225 and the feedback circuit 226.

When the generated $V_{DD}$ gets higher than the threshold voltage of the third transistor 231 in the feedback circuit 226, the third transistor 231 becomes conductive (a transistor is turned on and current flows). Current flows from the other terminal of the first capacitor element 220 in the input circuit 224 to which the AC signal is input, from the gate terminal and the source terminal of the first transistor 221, and from the drain terminal of the second transistor 222 through the second resistance element 232 and the third transistor 231 whereby impedance of the semiconductor device 233 can be changed. However, transmission of the AC signal occurs at the same time.

Even though transmission of the AC signal occurs, the transmitted AC signal is less likely to pass through the filter 227. Therefore, the $V_{DD}$ does not easily vary. Then, the $V_{DD}$ is supplied to the circuit portion 228.

When one resistance element and one capacitor element are connected to each other like the filter 227 having the above-described structure, the frequency (fc), the capacitance value (C), and the resistance value (R) are expressed by a formula, $fc<1/(2\pi CR)$. This formula shows that a frequency lower than $1/(2\pi CR)$ is likely to pass through the filter while a frequency higher than $1/(2\pi CR)$ is less likely to pass through the filter. This formula can estimate the capacitance value (C) and the resistance value (R) in accordance with the frequency of the AC signal whose transmission is to be suppressed.

It can be found that CR is preferably smaller than $1.6\times10^{-7}$ in order to make a frequency that is higher than 1 MHz less likely to pass through the filter, by using the aforementioned formula, e. g., C=16 pF and R=10 kΩ.

In the above-described structure, all transistors are N-type transistors but P-type transistors can also be used.

By employing the above-described structure, a semiconductor device of the present invention can suppress transmission of an AC signal. In addition, the constant voltage is less likely to vary, so that a malfunction or an operation defect such as complete inoperative can be prevented.

This embodiment mode can be implemented by being combined as appropriate with any of the aforementioned embodiment modes.

[Embodiment Mode 4]

Embodiment Mode 4 will describe another example of a filter circuit included in a semiconductor device of the present invention.

Figure 5:
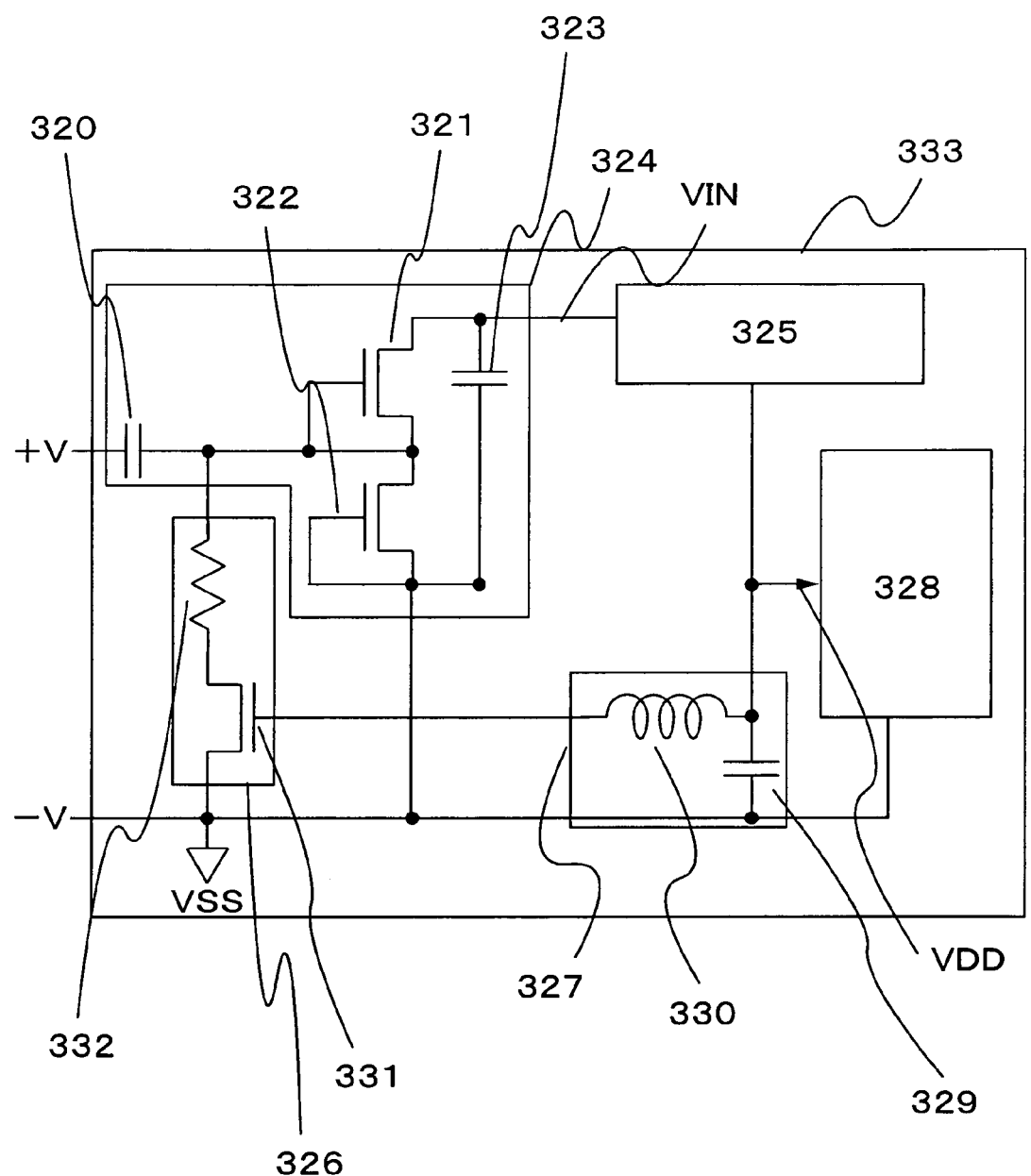
FIG. 5 illustrates Embodiment Mode 4 of the present invention.

FIG. 5 illustrates a circuit configuration. A semiconductor device 333 includes an input circuit 324, a circuit 325 which generates a constant voltage, a feedback circuit 326, a filter 327, and a circuit portion 328.

Two input terminals +V and −V of the semiconductor device 333 are electrically connected to a + terminal and a − terminal, respectively, of an element, which receives a radio signal, such as an antenna.

Note that both a voltage applied to the +V terminal and a voltage applied to the −V terminal are AC voltages. Hereinafter, a structure of the semiconductor device 333 will be specifically described with an example in which a voltage applied to the +V terminal is higher than that applied to the −V terminal.

The input circuit 324 includes a first capacitor element 320, a first transistor 321, a second transistor 322, and a second capacitor element 323. One terminal of the first capacitor element 320 is connected to the +V terminal and the other terminal of the first capacitor element 320 is connected to a gate terminal and a source terminal of the first transistor 321. The gate terminal and the source terminal of the first transistor 321 are connected to each other, and the first transistor 321 functions as a diode. In addition, a drain terminal of the first transistor 321 is connected to one terminal of the second capacitor element 323. A gate terminal and a source terminal of the second transistor 322 are connected to each other like the first transistor 321, and the second transistor 322 functions as a diode. Further, a drain terminal of the second transistor 322 is connected to the gate terminal and the source terminal of the first transistor 321. Furthermore, the gate terminal and the source terminal of the second transistor 322 are connected to the other terminal of the second capacitor element 323. Note that the other terminal of the second capacitor element 323 is also connected to the −V terminal. A half-wave voltage-doubling rectifier circuit is composed of the first capacitor element 320, the first transistor 321 and the second transistor 322.

A filter 327 includes a first inductor element 330 and a third capacitor element 329. One terminal of the first inductor element 330 is connected to one terminal of the third capacitor element 329 and an output of the circuit 325 which generates a constant voltage. The other terminal of the first inductor element 330 is connected to a gate terminal of a third transistor 331 included in the feedback circuit 326. The other terminal of the third capacitor element 329 is connected to the −V terminal. In FIG. 5, although the third capacitor element 329 is connected to the −V terminal and the one terminal of the first inductor element 330, the third capacitor element 329 may be connected to the −V terminal and the other terminal of the first inductor element 330.

The feedback circuit 326 includes the third transistor 331 and a second resistance element 332. A source terminal, the gate terminal, and a drain terminal of the third transistor 331 are connected to the −V terminal, the other terminal of the first inductor element 330 included in the filter 327, and one terminal of the second resistance element 332, respectively. The other terminal of the second resistance element 332 is connected to the other terminal of the first capacitor element 320 in the input circuit 324, and the gate terminal and the source terminal of the first transistor 321.

FIG. 5 illustrates an example of the feedback circuit 326 having the third transistor 331 and the second resistance element 332. However, the second resistance element 332 may be replaced with a capacitor element or a diode. The feedback circuit 326 may be any circuit as long as it changes impedance of the semiconductor device 333.

Note that when the voltage applied to the +V terminal is lower than that applied to the −V terminal, the source terminal and the drain terminal in each of the first transistor 321, the second transistor 322, and the third transistor 331 are exchanged with each other.

Operation of the semiconductor device 333 will be briefly described. A radio signal received by an antenna is input as an AC signal to the input circuit 324. The AC signal input to the input circuit 324 is rectified by the half-wave voltage-doubling rectifier circuit to generate a signal whose amplitude is approximately twice as large as the amplitude of a half-wave of the AC signal. Then, the generated signal is smoothed in the second capacitor element 323 to be a DC voltage (hereinafter also referred to as $V_{IN}$).

The generated $V_{IN}$ is input to the circuit 325 which generates a constant voltage and a constant voltage (hereinafter referred to as $V_{DD}$) whose voltage is lower and more constant than $V_{IN}$ is generated. A circuit configuration may be anything as long as it can make the voltage constant which is generated by one or both of voltage and current. For example, a regulator circuit can be given.

The generated $V_{DD}$ is supplied to the circuit portion 328. Note that the $V_{DD}$ passes through the filter 327 which is provided between the circuit 325 and the feedback circuit 326.

When the generated $V_{DD}$ gets higher than the threshold voltage of the third transistor 331 in the feedback circuit 326, the third transistor 331 becomes conductive (a transistor is turned on and current flows). Current flows from the other terminal of the first capacitor element 320 in the input circuit 324 to which the AC signal is input, from the gate terminal and the source terminal of the first transistor 321, and from the drain terminal of the second transistor 322 through the second resistance element 332 and the third transistor 331 whereby impedance of the semiconductor device 333 can be changed. However, transmission of the AC signal occurs at the same time.

Even though transmission of the AC signal occurs, the transmitted AC signal is less likely to pass through the filter 327. Therefore, the $V_{DD}$ does not easily vary. Then, the $V_{DD}$ is supplied to the circuit portion 328.

When one inductor element and one capacitor element are connected to each other like the filter 327 having the above-described structure, the frequency (fc), the inductance (L), and the capacitance value (C) are expressed by a formula, $fc<1/(2\pi(LC)^{1/2})$. This formula shows that a frequency lower than $1/(2\pi(LC)^{1/2})$ is likely to pass through the filter while a frequency higher than $1/(2\pi(LC)^{1/2})$ is less likely to pass through the filter. This formula can estimate the inductance (L) and the capacitance value (C) in accordance with frequency of the AC signal whose transmission is desired to be suppressed. Note that the nominal impedance (R) can be expressed by $R=(L/C)^{1/2}$.

It can be found that LC is preferably smaller than $1.38 \times 10^{-16}$ in order to make a frequency that is higher than 1 MHz less likely to pass through the filter, by using the aforementioned formula, e. g., L=3 µH, C=46 pF and R≡256Ω.

In the above-described structure, all transistors are N-type transistors but P-type transistors can also be used.

By employing the above-described structure, a semiconductor device of the present invention can suppress transmission of an AC signal. In addition, the constant voltage is less likely to vary, so that a malfunction or an operation defect such as complete inoperative can be prevented.

This embodiment mode can be implemented by being combined as appropriate with any of the aforementioned embodiment modes.

[Embodiment 1]

In Embodiment 1, manufacturing steps of a semiconductor device of the present invention will be described with reference to FIGS. 6A to 7D.

Figure 6A:
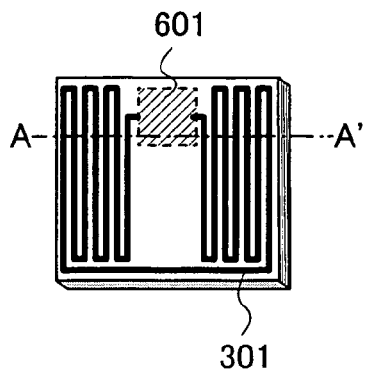
FIGS. 6A to 6D illustrate Embodiment 1 of the present invention.
Figure 6B:
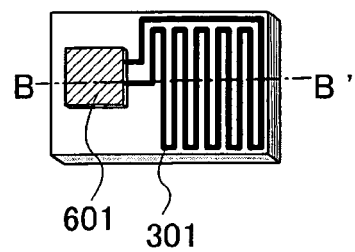
Figure 6C:
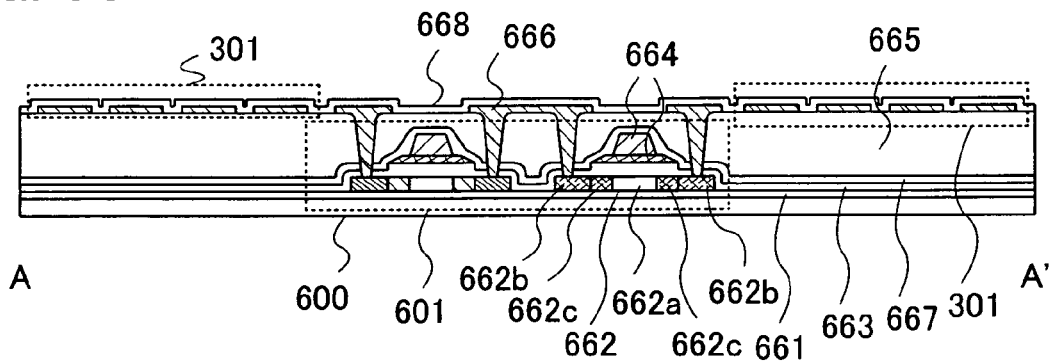
Figure 6D:
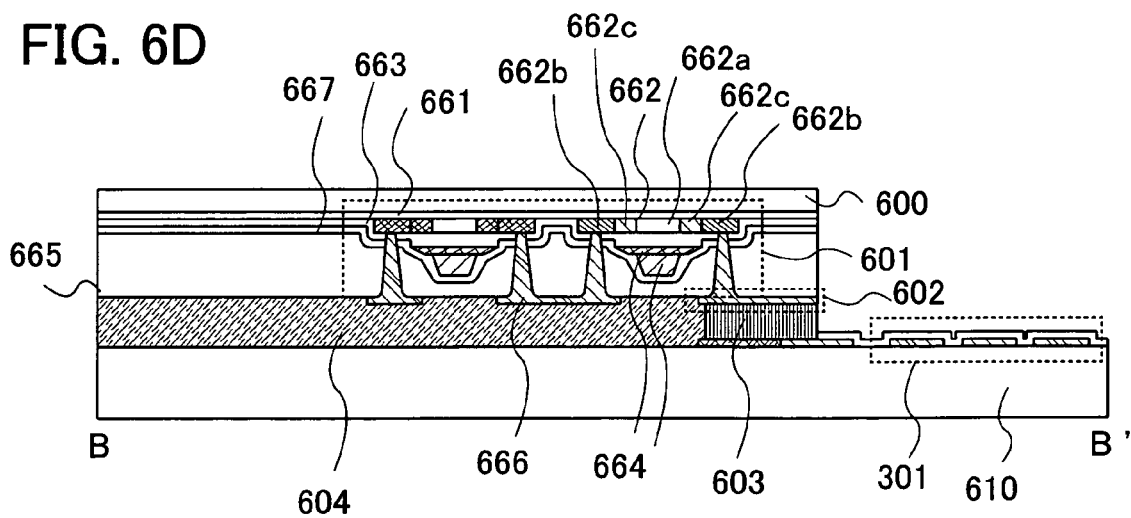

First, FIGS. 6A to 6D illustrate a structural example of the antenna 301 in the RFID tag shown in FIG. 2. The antenna 301 is provided in two ways, one of which (hereinafter referred to as a first antenna installation system) is shown in FIGS. 6A and 6C and the other (hereinafter referred to as a second antenna installation system) is shown in FIGS. 6B and 6D. FIG. 6C is a cross-sectional view along a line A-A' of FIG. 6A, while FIG. 6D is a cross-sectional view along a line B-B' of FIG. 6B.

According to the first antenna installation system, the antenna 301 is provided over a substrate 600 over which a plurality of elements (hereinafter referred to as an element group 601) are provided (see FIGS. 6A and 6C). A circuit other than the antenna in the semiconductor device of the present invention is formed of the element group 601. The element group 601 includes a plurality of thin film transistors. In FIG. 6C, a conductive film functioning as the antenna 301 is provided in the same layer as a wire 666 which is connected to a source or drain of the thin film transistor included in the element group 601. However, the conductive film functioning as the antenna 301 may be provided in the same layer as a gate electrode 664 of the thin film transistor included in the element group 601, or may be provided over an insulating film which is provided so as to cover the element group 601.

According to the second antenna installation system, a terminal portion 602 is provided on the substrate 600 on which the element group 601 is provided. Then, the terminal portion 602 is connected to the antenna 301 which is formed over a substrate 610 which is different from the substrate 600 (see FIGS. 6B and 6D). In FIG. 6D, part of a wire 666 connected to a source or drain of the thin film transistor included in the element group 601 may be used as the terminal portion 602. Then, the substrate 600 is attached to the substrate 610 over which the antenna 301 is provided, so that the antenna 301 is connected to the terminal portion 602. A conductive particle 603 and a resin 604 are provided between the substrate 600 and the substrate 610. The antenna 301 is electrically connected to the terminal portion 602 with the conductive particle 603.

Next, the structure and manufacturing method of the element group 601 are described. When a plurality of element groups 601 are formed on a large substrate and cut off to be completed, an inexpensive element group can be provided. As the substrate 600, for example, a glass substrate made of barium borosilicate glass, aluminoborosilicate glass, or the like, a quartz substrate, a ceramic substrate, or the like can be used. Alternatively, a semiconductor substrate of which the surface is provided with an insulating film may be used. A substrate made of a flexible synthetic resin such as plastic may also be used. The surface of the substrate may be planarized by polishing using a CMP method or the like. A substrate which is thinned by polishing a glass substrate, a quartz substrate, or a semiconductor substrate may be used as well.

As a base film 661 formed on the substrate 600, an insulating film made of silicon oxide, silicon nitride, silicon nitride oxide, or the like can be used. The base film 661 can prevent an alkali metal such as Na or an alkaline earth metal contained in the substrate 600, from being diffused in a semiconductor layer 662 and adversely affecting characteristics of the thin film transistor. Although the base film 661 shown in FIGS. 6C and 6D has a single-layer structure, it may have a two or more layer structure. Note that when the diffusion of impurities is not a serious problem such as in a quartz substrate, the base film 661 is not necessarily provided.

Note that the surface of the substrate 600 may be directly processed by high density plasma to form the base film 661. The high density plasma is generated using a microwave, for example, in 2.45 GHz. High density plasma with an electron density of $10^{11}$ to $10^{13}/cm^3$, an electron temperature of 2 eV or lower, and an ion energy of 5 eV or lower is used. Since such high density plasma featuring a low electron temperature has low kinetic energy of active species, a film with less plasma damage and defects can be formed compared to that formed by conventional plasma treatment. Plasma can be generated using a plasma processing apparatus utilizing microwave excitation, which employs a radial slot antenna. The distance between the antenna which generates a microwave and the substrate 600 is set at 20 to 80 mm (preferably, 20 to 60 mm).

The surface of the substrate 600 can be nitrided by performing the high density plasma treatment in a nitrogen atmosphere, for example an atmosphere containing nitrogen (N) and a rare gas (containing at least one of He (helium), Ne (neon), Ar (argon), Kr (krypton), and Xe (xenon)), an atmosphere containing nitrogen, hydrogen (H), and a rare gas, or an atmosphere containing ammonium ($NH_3$) and a rare gas. When the substrate 600 is made of glass, quartz, a silicon wafer, or the like, a nitride layer formed on the surface of the substrate 600 contains silicon nitride as a main component. Therefore, the nitride layer can be used as a blocking layer against impurities diffused from the substrate 600 side. A silicon oxide film or a silicon oxynitride film may be formed on the nitride layer by a plasma CVD method and may be used as the base film 661.

When similar high density plasma treatment is applied to the surface of the base film 661 made of silicon oxide, silicon oxynitride, or the like, the surface and a region with a depth of 1 to 10 nm from the surface can be nitrided. This extremely thin silicon nitride layer is favorable since it functions as a blocking layer and has less stress on the semiconductor layer 662 formed on this extremely thin silicon nitride layer.

As the semiconductor layer 662, a crystalline semiconductor film or an amorphous semiconductor film, which is patterned into a desired shape, can be used. Alternatively, an organic semiconductor film may be used. A crystalline semiconductor film can be obtained by crystallizing an amorphous semiconductor film. A laser crystallization method, a thermal crystallization method using RTA or an annealing furnace, a thermal crystallization method using a metal element which promotes crystallization, or the like can be used as the crystallization method. The semiconductor layer 662 includes a channel formation region 662a and a pair of impurity regions 662b to which an impurity element imparting a conductivity type is added. Although a structure is shown where low concentration impurity regions 662c to which the impurity element is added at a lower concentration than that of the impurity regions 662b are provided between the channel formation region 662a and the pair of impurity regions 662b, the present invention is not limited to this. The low concentration impurity regions 662c are not necessarily provided.

An impurity element which imparts a conductivity type may be added to the channel formation region 662a of the thin film transistor. In this manner, the threshold voltage of the thin film transistor can be controlled.

A first insulating layer 663 can have a single-layer or a stack of a plurality of films made of silicon oxide, silicon nitride, silicon nitride oxide, or the like. In this case, the surface of the first insulating layer 663 may be processed by high density plasma in an oxygen atmosphere or a nitrogen atmosphere, thereby being oxidized or nitrided to be densified. The high density plasma is generated using a microwave, for example, in 2.45 GHz, as described above. Note that high density plasma with an electron density of $10^{11}$ to $10^{13}/cm^3$, an electron temperature of 2 eV or lower, and an ion energy of 5 eV or lower is used. Plasma can be generated using a plasma processing apparatus utilizing microwave excitation, which employs a radial slot antenna. In the apparatus for generating high density plasma, the distance between the antenna which generates a microwave and the substrate 600 is set at 20 to 80 mm (preferably, 20 to 60 mm).

Before forming the first insulating layer 663, the high density plasma treatment may be applied to the surface of the semiconductor layer 662 so that the surface of the semiconductor layer is oxidized or nitrided. At this time, by performing the treatment in an oxygen atmosphere or a nitrogen atmosphere with the substrate 600 at a temperature of 300 to 450° C., a favorable interface with the first insulating layer 663 which is formed on the semiconductor layer 662 can be obtained.

As the nitrogen atmosphere, an atmosphere containing nitrogen (N) and a rare gas (containing at least one of He (helium), Ne (neon), Ar (argon), Kr (krypton), and Xe (xenon)), an atmosphere containing nitrogen, hydrogen (H), and a rare gas, or an atmosphere containing ammonium ($NH_3$) and a rare gas can be used. As the oxygen atmosphere, an atmosphere containing oxygen (O) and a rare gas, an atmosphere containing oxygen, hydrogen (H), and a rare gas, or an atmosphere containing dinitrogen monoxide ($N_2O$) and a rare gas can be used.

The gate electrode 664 may have a single-layer structure or stacked-layer structure including one element selected from Ta (tantalum), W (tungsten), Ti (titanium), Mo (molybdenum), Al (aluminum), Cu (copper), Cr (chromium), or Nd (neodymium), or an alloy or a compound containing a plurality of the above-described elements. In FIGS. 6C and 6D, the gate electrode 664 has a two-layer structure.

A thin film transistor is formed of the semiconductor layer 662, the gate electrode 664, and the first insulating layer 663 functioning as a gate insulating film between the semiconductor layer 662 and the gate electrode 664. In this embodiment, the thin film transistor has a top gate structure; however, it may be a bottom gate transistor having a gate electrode under the semiconductor layer, or a dual gate transistor having gate electrodes over and under the semiconductor layer.

A second insulating layer 667 is desirably an insulating film such as a silicon nitride film, which has barrier properties to block ion impurities. The second insulating layer 667 is made of silicon nitride or silicon oxynitride. The second insulating layer 667 functions as a protective film to prevent contamination of the semiconductor layer 662. After depositing the second insulating layer 667, hydrogen gas may be introduced and the aforementioned high density plasma treatment may be applied, thereby hydrogenating the second insulating layer 667. Alternatively, the second insulating layer 667 may be nitrided and hydrogenated by introducing ammonium ($NH_3$) gas. Otherwise, oxidization-nitridation treatment and hydrogenation treatment may be performed by introducing oxygen, dinitrogen monoxide ($N_2O$) gas, and the like together with hydrogen gas. By performing nitridation treatment, oxidization treatment, or oxidization-nitridation treatment in this manner, the surface of the second insulating layer 667 can be densified. As a result, the function of the second insulating layer 667 as a protective film can be enhanced. Hydrogen introduced into the second insulating layer 667 is discharged when thermal treatment is applied at a temperature of 400 to 450° C., thereby hydrogenating the semiconductor layer 662. Note that the hydrogenation treatment may be performed in combination with hydrogenation treatment using the first insulating layer 663.

A third insulating layer 665 can have a single-layer structure or a stacked-layer structure of an inorganic insulating film or an organic insulating film. As the inorganic insulating film, a silicon oxide film formed by a CVD method, a silicon oxide film formed by an SOG (spin on glass) method, or the like can be used. As the organic insulating film, a film made of polyimide, polyamide, BCB (benzocyclobutene), acrylic, a positive photosensitive organic resin, a negative photosensitive organic resin, or the like can be used.

The third insulating layer 665 may be made of a material having a skeleton structure formed of a bond of silicon (Si) and oxygen (O). An organic group containing at least hydrogen (such as an alkyl group and aromatic hydrocarbon) is used as a substituent of this material. Alternatively, a fluoro group may be used as the substituent. Further alternatively, a fluoro group and an organic group containing at least hydrogen may be used as the substituent.

The wire 666 can have a single-layer structure or a stacked-layer structure including one element selected from Al (aluminum), Ni (nickel), W (tungsten), Mo (molybdenum), Ti (titanium), Pt (platinum), Cu (copper), Ta (tantalum), Au (gold), or Mn (manganese), or an alloy containing a plurality of the above-described elements. In FIGS. 6C and 6D, a single-layer structure is shown as an example. In the structure shown in FIGS. 6A and 6C, the wire 666 functions as a wire connected to the source or drain of the thin film transistor and also as the antenna 301. In the structure shown in FIGS. 6B and 6D, the wire 666 functions as the wire connected to the source or drain of the thin film transistor and also as the terminal portion 602.

The antenna 301 can also be formed by a droplet discharge method using a conductive paste containing nano-particles such as Au, Ag, and Cu. The droplet discharge method is a collective term for a method for forming a pattern by discharging droplets, such as an ink jet method and a dispenser method, which has advantages in that the utilization efficiency of a material is improved, and the like.

In the structures shown in FIGS. 6A and 6C, a fourth insulating layer 668 is formed over the wire 666. The fourth insulating layer 668 can have a single-layer structure or a stacked-layer structure of an inorganic insulating film or an organic insulating film. The fourth insulating layer 668 functions as a protective layer of the antenna 301.

Figure 7A:
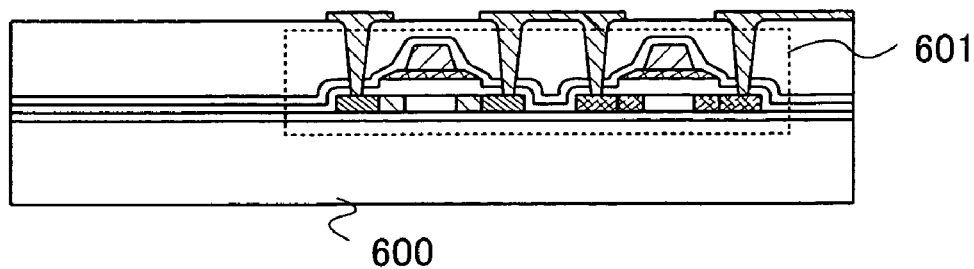
FIGS. 7A to 7D illustrate Embodiment 1 of the present invention.
Figure 7B:
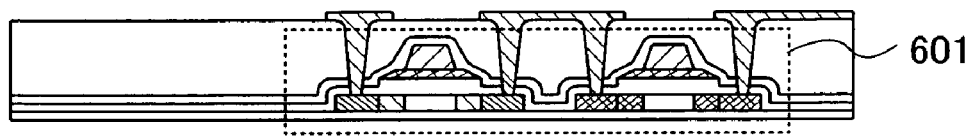
Figure 7C:
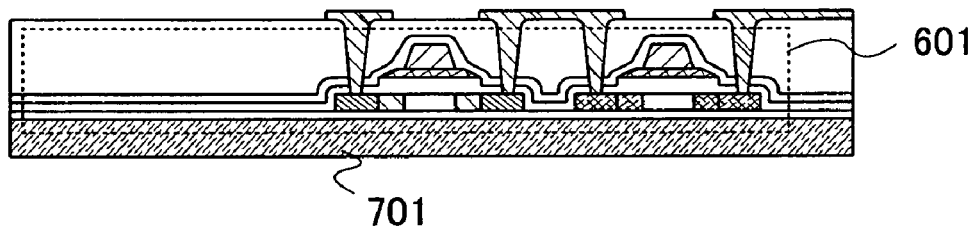
Figure 7D:
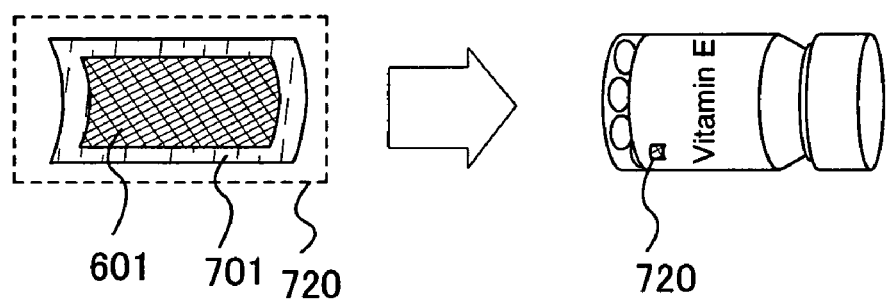

Although the element group 601 may use the one formed over the substrate 600 (see FIG. 7A) as it is, the element group 601 over the substrate 600 may be separated (see FIG. 7B), and the element group 601 may be attached to a flexible substrate 701 (see FIG. 7C). The flexible substrate 701 has flexibility, and for example, a plastic substrate such as polycarbonate, polyarylate, and polyethersulfone, a ceramic substrate, or the like can be used.

As a method for separating the element group 601 from the substrate 600, any of the following can be used: (A) a method in which a release layer is provided in advance between the substrate 600 and the element group 601 and the release layer is removed by an etchant; (B) a method in which the release layer is partially removed by an etchant, and then the substrate 600 and the element group 601 are separated physically; and (C) a method in which the substrate 600 with high heat resistance over which the element group 601 is formed is eliminated mechanically or removed by etching with a solution or gas so that the element group 601 is separated. Note that "to be separated by a physical means" denotes that to be separated by applying stress from outside, for example, to be separated by applying stress from a wind pressure of gas sprayed from a nozzle, an ultrasonic wave, or the like.

As a specific method of the aforementioned FIG. 7A or 7B, a method in which a metal oxide film is provided between the substrate 600 with high heat resistance and the element group 601, and the metal oxide film is weakened by crystallization to separate the element group 601 can be used; or a method in which an amorphous silicon film containing hydrogen is provided between the substrate 600 with high heat resistance and the element group 601, and the amorphous silicon film is removed by irradiation with a laser beam or etching so that the element group 601 is separated can be used.

In addition, to attach the separated element group 601 to the flexible substrate 701, a commercial adhesive may be used, and for example, an adhesive such as an epoxy resin-based adhesive or a resin additive may be used.

By attaching the element group 601 to the flexible substrate 701 over which the antenna is formed and electrically connecting the element group 601 with the antenna, a thin and light semiconductor device which is not easily broken even when fallen to the ground, is obtained (see FIG. 7C). When an inexpensive flexible substrate 701 is used, an inexpensive semiconductor device can be provided. Furthermore, the flexible substrate 701 having flexibility can be attached to a curved surface or an irregular-shaped substance, which realizes various kinds of usage. For example, a wireless tag 720 as one mode of a semiconductor device of the present invention can be attached to a curved surface such as a medicine bottle (see FIG. 7D). Furthermore, when the substrate 600 is reused, a semiconductor device can be manufactured at low cost.

Although this embodiment describes a thin film transistor as an example, the present invention is not limited thereto. In addition to the thin film transistor, a transistor formed of a single crystalline silicon, a transistor formed of SOI, or the like can be used. Moreover, a transistor formed of an organic semiconductor or a transistor formed of a carbon nanotube can be used.

This embodiment can be implemented by being combined as appropriate with any of the above-described embodiment modes.

[Embodiment 2]

Figure 8A:
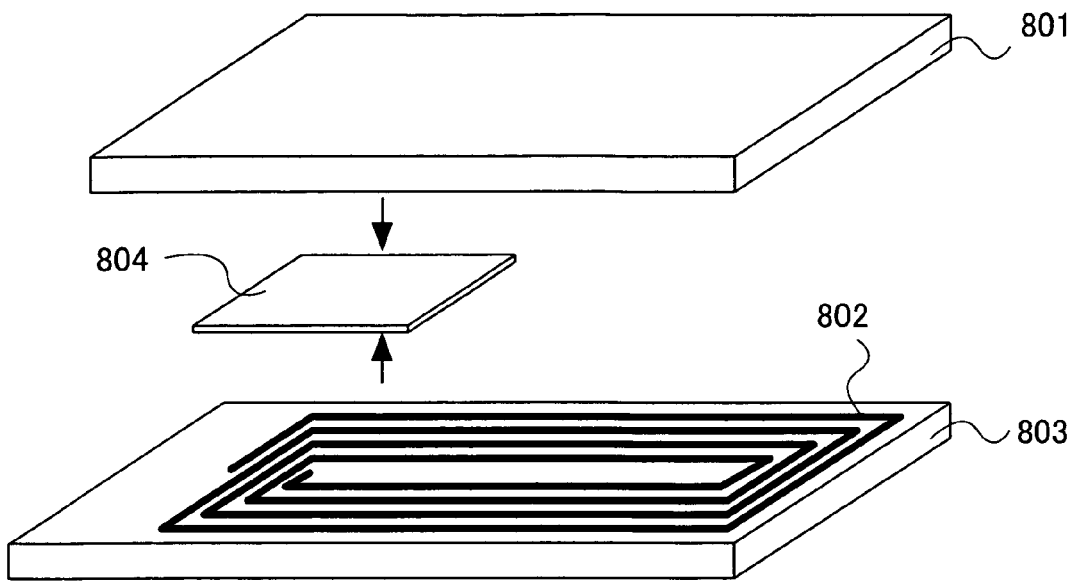
FIGS. 8A to 8C illustrate Embodiment 2 of the present invention.

In this embodiment, an example in which a semiconductor device has a flexible structure is described with reference to FIGS. 8A to 8C. In FIG. 8A, a semiconductor device includes a flexible protective layer 801, a flexible protective layer 803 including an antenna 802, and an element group 804 formed by a separation process or thinning of a substrate. The element group 804 can have a similar structure to the element group 601 described in the Embodiment 1. The antenna 802 formed over the protective layer 803 is electrically connected to the element group 804. In FIG. 8A, the antenna 802 is formed only over the protective layer 803; however, the present invention is not limited to this structure and the antenna 802 may be formed over the protective layer 801 as well. Note that a barrier film made of a silicon nitride film or the like may be formed between the element group 804 and each of the protective layer 801 and the protective layer 803. As a result, contamination of the element group 804 can be prevented, which leads to a semiconductor device with improved reliability.

The antenna 802 can be formed of Ag, Cu, or a metal plated with Ag or Cu. The element group 804 and the antenna 802 can be connected to each other using an anisotropic conductive film and applying ultraviolet treatment or ultrasonic wave treatment. Note that the element group 804 and the antenna 802 may be attached to each other using a conductive paste or the like.

By sandwiching the element group 804 between the protective layer 801 and the protective layer 803, a semiconductor device is completed (see arrows in FIG. 8A).

Figure 8B:
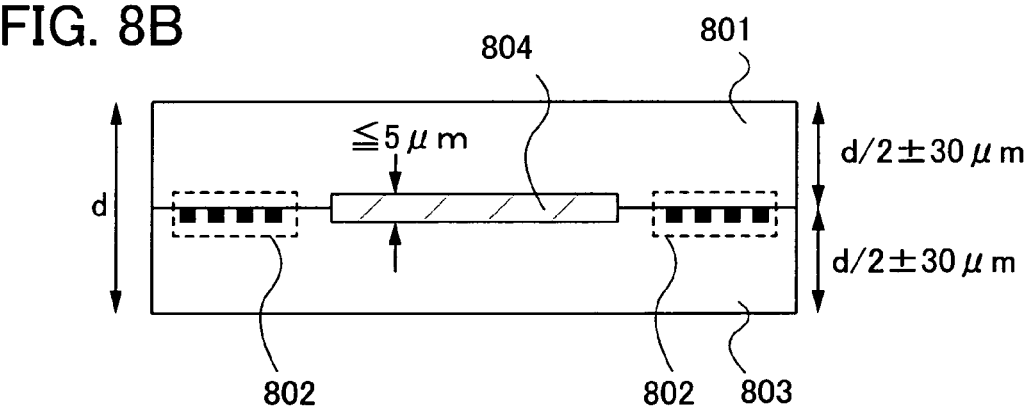
Figure 8C:
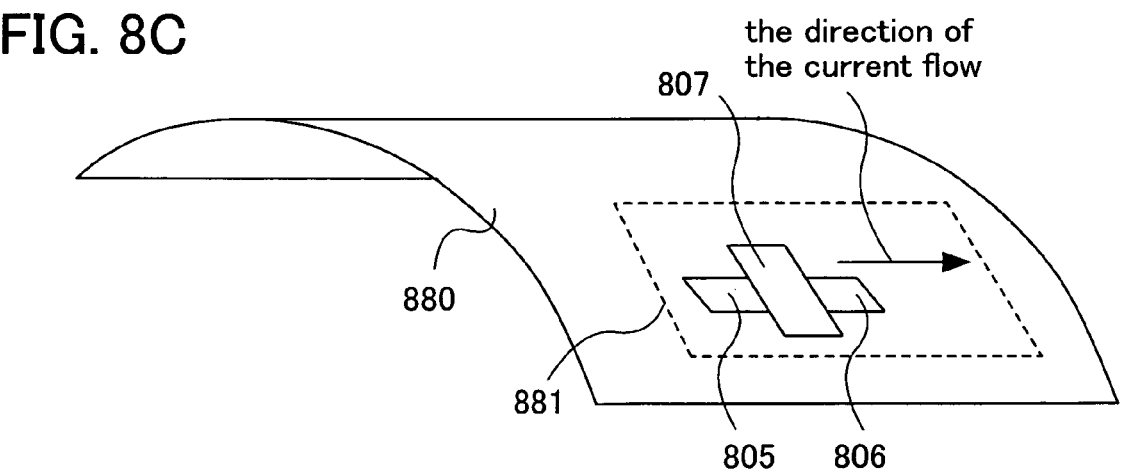

FIG. 8B shows a cross-sectional structure of the thus formed semiconductor device. A thickness of the element group 804 which is sandwiched is 5 µm or less ($\leq 5$ µm), and preferably 0.1 to 3 µm. Furthermore, when the protective layer 801 and the protective layer 803 which overlap each other have a thickness of d, each of the protective layer 801 and the protective layer 803 preferably has a thickness of (d/2)±30 μm, and more preferably (d/2)±10 μm. In addition, each of the protective layer 801 and the protective layer 803 desirably has a thickness of 10 to 200 μm. The element group 804 has an area of 10 mm square (100 mm$^2$) or smaller, and desirably 0.3 to 4 mm square (0.09 to 16 mm$^2$).

Each of the protective layer 801 and the protective layer 803 is made of an organic resin material, and thus has high resistance against bending. The element group 804 which is formed by a separation process or thinning of a substrate also has higher resistance against bending compared to a single crystal semiconductor. Since the element group 804, the protective layer 801, and the protective layer 803 can be tightly attached to each other without any space, a completed semiconductor device itself also has high resistance against bending. The element group 804 surrounded by the protective layer 801 and the protective layer 803 may be provided over a surface or inside of another object, or embedded in paper.

The case where a semiconductor device including the element group 804 is attached to a substrate having a curved surface is described with reference to FIG. 8C. FIG. 8C shows one transistor 881 selected from the element group 804. In the transistor 881, a current flows from one 805 of a source and a drain to the other 806 of the source and the drain in response to a potential of a gate electrode 807. The transistor 881 is provided so that a direction of the current flow in the transistor 881 (carrier movement direction) and the direction of the arc of a substrate 880 cross at right angles. With such an arrangement, the transistor 881 is less affected by stress even when the substrate 880 is bent to be an arc, and thus variations in characteristics of the transistor 881 included in the element group 804 can be suppressed.

This embodiment can be implemented by being combined as appropriate with any of the aforementioned embodiment modes and embodiment.

[Embodiment 3]

Figure 9:
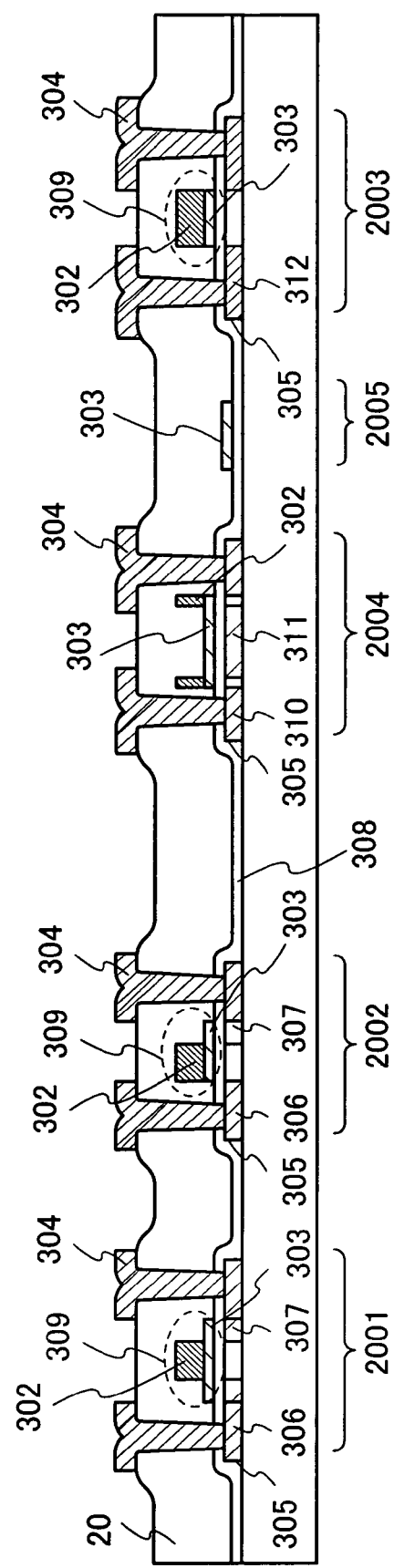
FIG. 9 illustrates Embodiment 3 of the present invention.

This embodiment shows a structural example of a transistor included in a circuit which constitutes a semiconductor device 201. The transistor may be a MOS transistor formed over a single crystalline substrate, or a thin film transistor (TFT) as well. FIG. 9 shows a cross-sectional structure of such transistors included in a circuit. FIG. 9 shows an N-channel transistor 2001, an N-channel transistor 2002, a capacitor element 2004, a resistor element 2005, and a P-channel transistor 2003. Each of the transistors includes a semiconductor layer 305, an insulating layer 308, and a gate electrode 309. The gate electrode 309 has a stacked-layer structure of a first conductive layer 303 and a second conductive layer 302. FIGS. 10A to 10E are top views corresponding to the transistor, the capacitor element, and the resistance element shown in FIG. 9. FIG. 9 and FIGS. 10A to 10E can be referred by corresponding with each other.

FIG. 9 shows that, in the N-channel transistor 2001, impurity regions 307, which are also referred to as a lightly doped drain (LDD) regions, are formed in the semiconductor layer 305 on both sides of a channel region in a channel length direction (a direction of carrier flow). The impurity regions 307 are doped at a lower concentration than the impurity concentration of impurity regions 306 that form a source region and a drain region which are in contact with wires 304. In the case of forming the N-channel transistor 2001, the impurity regions 306 and the impurity regions 307 are added with an impurity imparting N-type conductivity, such as phosphorus. The LDD regions are formed to suppress hot electron degradation and short channel effects.

Figure 10A:
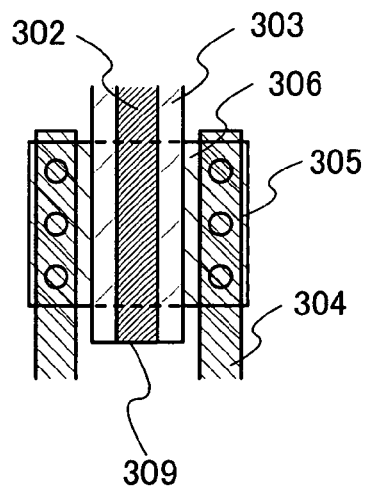
FIGS. 10A to 10E illustrate Embodiment 3 of the present invention.

As shown in FIG. 10A, in the gate electrode 309 of the N-channel transistor 2001, the first conductive layer 303 is extensively provided on both sides of the second conductive layer 302. In this case, the thickness of the first conductive layer 303 is smaller than that of the second conductive layer 302. The first conductive layer 303 is formed to have such a thickness that ion species accelerated with an electric field of 10 to 100 kV can pass through the first conductive layer 303. The impurity regions 307 are formed so as to overlap with the first conductive layer 303 of the gate electrode 309. In other words, the LDD regions overlapping with the gate electrode 309 are formed. The impurity regions 307 are formed in a self-alignment manner by addition of an impurity having one conductivity type through the first conductive layer 303 using the second conductive layer 302 as a mask. That is, the LDD regions overlapping with the gate electrode are formed in a self-alignment manner.

A transistor having LDD regions on both sides of a channel region is applied to a transistor constituting a transmission gate (also referred to as an analog switch) used for a logic circuit, or rectifier transistors such as the first transistor 221 and the second transistor 222 which configure a half-wave voltage-doubling rectifier circuit in the input circuit 224 shown in FIG. 4. Such a transistor preferably includes LDD regions on both sides of the channel region, since positive and negative voltages are applied to source and drain electrodes.

Figure 10B:
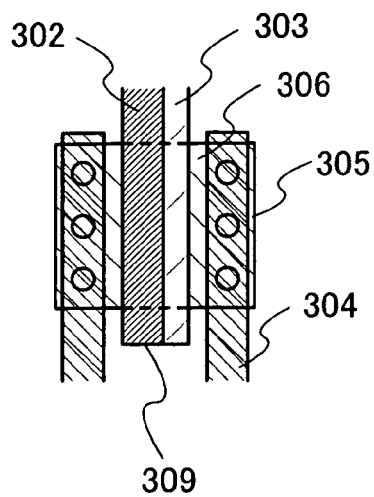

In the N-channel transistor 2002 of FIG. 9, the impurity region 307 doped with an impurity element at a lower concentration than impurity concentration of the impurity regions 306 is formed on one side of the gate electrode in the semiconductor layer 305. As shown in FIG. 10B, in the gate electrode 309 of the N-channel transistor 2002, the first conductive layer 303 is provided extensively on one side of the second conductive layer 302. In this case as well, the LDD region can be formed in a self-alignment manner by addition of an impurity having one conductivity type through the first conductive layer 303 using the second conductive layer 302 as a mask.

A transistor having an LDD region on one side may be applied to a transistor in which only one of a positive voltage and a negative voltage is applied between a source electrode and a drain electrode. Specifically, the transistor having an LDD region on one side may be applied to a transistor constituting a logic gate such as an inverter circuit, a NAND circuit, a NOR circuit, and a latch circuit, or a transistor generating an analog circuit such as a sense amplifier, the circuit 225 which generates a constant voltage in FIG. 4, and a VCO (voltage controlled oscillator).

Figure 10C:
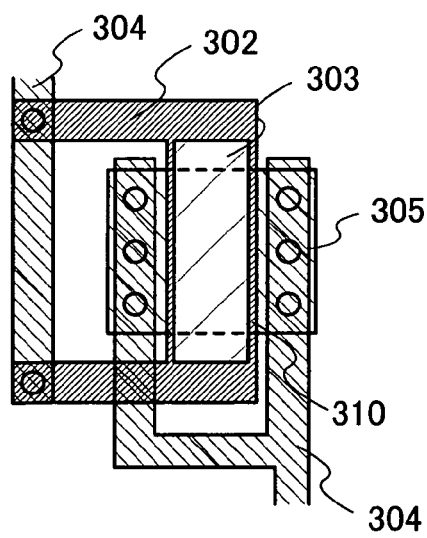

In FIG. 9, the capacitor element 2004 has a structure in which the insulating layer 308 is sandwiched between the first conductive layer 303 and the semiconductor layer 305. The semiconductor layer 305 of the capacitor element 2004 includes impurity regions 310 and an impurity region 311. The impurity region 311 is formed in the semiconductor layer 305 so as to overlap with the first conductive layer 303. The impurity regions 310 are in contact with the wires 304. Since an impurity having one conductivity type can be added to the impurity region 311 through the first conductive layer 303, the impurity regions 310 and the impurity region 311 may have the same concentration or different concentrations of an impurity. In any case, the semiconductor layer 305 of the capacitor element 2004 functions as an electrode; therefore, it is preferable that an impurity having one conductivity type be added to the semiconductor layer 305 to reduce the resistance thereof. The first conductive layer 303 can effectively function as an electrode by utilizing the second conductive layer 302 as an auxiliary electrode as shown in FIG. 10C. Such a composite electrode structure combining the first conductive layer 303 and the second conductive layer 302 allows the capacitor element 2004 to be formed in a self-alignment manner.

The capacitor element 2004 can be used as the first capacitor element 220 and the second capacitor element 223 included in the input circuit 224, and the third capacitor element 229 included in the filter 227, which are shown in FIG. 4, or a resonant capacitor included in the antenna 301 shown in FIG. 2. In particular, the resonant capacitor is required to function as a capacitor regardless of a positive or negative voltage applied between two terminals of the capacitor element, since both positive and negative voltages are applied between the two terminals. The resonant capacitor constitutes the antenna 301 and a resonant circuit to resonate with the frequency of a radio signal sent from an antenna connected to a reader/writer.

Figure 10D:
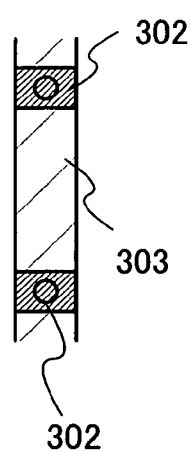

In FIGS. 9 and 10D, the resistor element 2005 includes the first conductive layer 303. The first conductive layer 303 is formed to have a thickness of approximately 30 to 150 nm; therefore, the resistor element can be formed by setting the width and length thereof as appropriate.

The resistor element can be used as the resistance element 230 included in the filter 227, as well as the second resistance element 232 included in the feedback circuit 226, which are shown in FIG. 4. In addition, the resistance element is, in some cases, also used as a load when current is controlled by a VCO or the like. The resistor element may be formed using a semiconductor layer containing an impurity at a high concentration, or a thin metal layer. The resistance of a semiconductor layer depends on the film thickness, film quality, impurity concentration, activation rate, and the like whereas the resistance of a metal layer is determined by the film thickness and film quality and has few variations, which is preferable.

In FIG. 9, the semiconductor layer 305 includes impurity regions 312 in the P-channel transistor 2003. The impurity regions 312 function as source and drain regions which are in contact with the wires 304 through an interlayer insulating film 20. The gate electrode 309 has a structure in which the first conductive layer 303 and the second conductive layer 302 overlap with each other (see FIGS. 9 and 10E). The P-channel transistor 2003 is a transistor with a single drain structure in which an LDD region is not provided. When the P-channel transistor 2003 is formed, an impurity which imparts P-type conductivity, such as boron, is added to the impurity regions 312. On the other hand, when phosphorus is added to the impurity regions 312, an N-channel transistor with a single drain structure can be obtained.

One or both of the semiconductor layer 305 and the insulating layer 308 may be oxidized or nitrided by high density plasma treatment. This treatment can be performed in a similar manner to that described in Embodiment 1.

According to the aforementioned treatment, the defect level at the interface between the semiconductor layer 305 and the insulating layer 308 can be reduced. When this treatment is applied to the insulating layer 308, the insulating layer 308 can be densified. In other words, generation of defective charges and variations in the threshold voltage of the transistor can be suppressed. When the transistor is driven with a voltage of 3 V or lower, an insulating layer which is oxidized or nitrided by the plasma treatment can be used as the insulating layer 308. If the driving voltage of the transistor is 3 V or higher, the insulating layer 308 can be formed by combining an insulating layer formed over the surface of the semiconductor layer 305 by the plasma treatment and an insulating layer deposited by a CVD method (a plasma CVD method or a thermal CVD method). In addition, similarly, the insulating layer may be used as a dielectric layer of the capacitor element 2004. In this case, the insulating layer formed by the plasma treatment is a dense film with a thickness of 1 to 10 nm; therefore, the capacitor element 2004 with large charge capacity can be obtained.

As described with reference to FIGS. 9 to 10E, the elements with various structures can be formed by combining conductive layers with different thicknesses. A region where only the first conductive layer is formed and a region where the first conductive layer and the second conductive layer are stacked can be formed using a photomask or a reticle provided with a diffraction grating pattern or an auxiliary pattern having an optical intensity reducing function formed of a semitransparent film. That is, in a photolithography process, the quantity of transmitted light through the photomask is controlled in exposing the photoresist to light so that the thickness of a resist mask to be developed is changed. In this case, a slit at the resolution limit or less may be provided in the photomask or the reticle to form the above-described resist having the different thickness. In addition, by baking at about 200° C. after developing, a mask pattern made from a photoresist material can be changed in shape.

In addition, by using the photomask or the reticle which is provided with a diffraction grating pattern or an auxiliary pattern having an optical intensity reducing function formed of a semitransparent film, the region where only the first conductive layer is formed and the region where the first conductive layer and the second conductive layer are stacked can be formed in succession. As shown in FIG. 10A, the region where only the first conductive layer is formed can be formed as selected over the semiconductor layer. Such a region is effective over the semiconductor layer, but is not required in the other region (a wire region which is connected to the gate electrode). Since the region where only the first conductive layer is formed is not required to be formed in the wire portion by using this photomask or reticle, wire density can be highly improved.

Figure 10E:
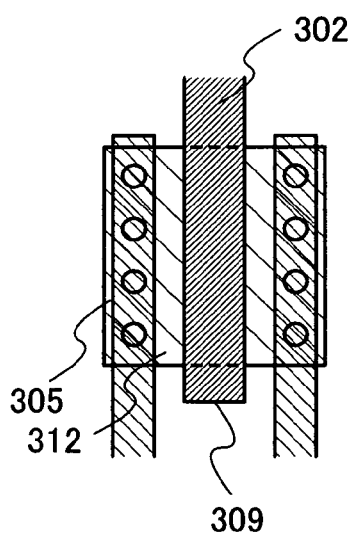

In the case of FIGS. 9 to 10E, the first conductive layer is formed to have a thickness of 30 to 50 nm using a high melting point metal such as tungsten (W), chromium (Cr), tantalum (Ta), tantalum nitride, or molybdenum (Mo), or an alloy or a compound containing a high melting point metal as its main component. In addition, the second conductive layer is formed to have a thickness of 300 to 600 nm using a high melting point metal such as tungsten (W), chromium (Cr), tantalum (Ta), tantalum nitride, or molybdenum (Mo), or an alloy or a compound containing a high melting point metal as its main component. For example, the first conductive layer and the second conductive layer are made of different conductive materials so as to have a difference in etching rate in the subsequent etching step. The first conductive layer and the second conductive layer may be made of, for example, tantalum nitride and a tungsten film, respectively.

According to the description of this embodiment, transistors having different electrode structures, a capacitor element, and a resistance element can be formed separately with the same patterning process by using the photomask or the reticle which is provided with a diffraction grating pattern or an auxiliary pattern having an optical intensity reducing function formed of a semitransparent film. Accordingly, in accordance with circuit characteristics, elements having different modes can be formed without increasing the number of steps, and integrated.

This embodiment can be implemented by being combined as appropriate with the aforementioned embodiment modes and embodiments.

[Embodiment 4]

In this embodiment, applications of the RFID tag 300 including the semiconductor device 201 of the present invention will be described with reference to FIGS. 11A to 12E. The RFID tag 300 can be incorporated in, for example, bills, coins, securities, bearer bonds, certificates (driving license, resident card, and the like, see FIG. 12A), containers for wrapping objects (wrapping paper, bottle, and the like, see FIG. 12B), recording media such as DVD software, CDs, and video tapes (see FIG. 12C), vehicles such as cars, motorbikes, and bicycles (see FIG. 12D), personal belongings such as bags and glasses (see FIG. 12E), foods, clothes, commodities, electronic apparatuses, and the like. The electronic apparatuses include a liquid crystal display device, an EL display device, a television set (also simply referred to as a television or a television receiver), a mobile phone, and the like.

The RFID tag 300 can be fixed to an object by being attached to the surface of the object or embedded in the object. For example, the RFID tag 300 may be embedded in paper of a book, or organic resin of a package. When the RFID tag 300 is incorporated in bills, coins, securities, bearer bonds, certificates, and the like, forgery thereof can be prevented. Furthermore, when RFID tag 300 is incorporated in containers for wrapping objects, recording media, personal belongings, foods, clothes, commodities, electronic apparatuses, and the like, an inspection system, a rental system of a rental shop, and the like can be performed more efficiently. The RFID tag 300 can also prevent vehicles from being forged or stolen. In addition, when the RFID tag 300 is implanted into creatures such as animals, each creature can be identified easily. For example, when the wireless tag is implanted into creatures such as domestic animals, the year of birth, sex, breed, and the like thereof can be identified easily.

As described above, the semiconductor device 201 of the present invention can be incorporated in any object (including creatures).

The semiconductor device 201 has various advantages such that data can be sent and received through wireless communication, the semiconductor device 201 can be processed into various shapes, and wide directivity and recognition range are achieved depending on a selected frequency.

Figure 11A:
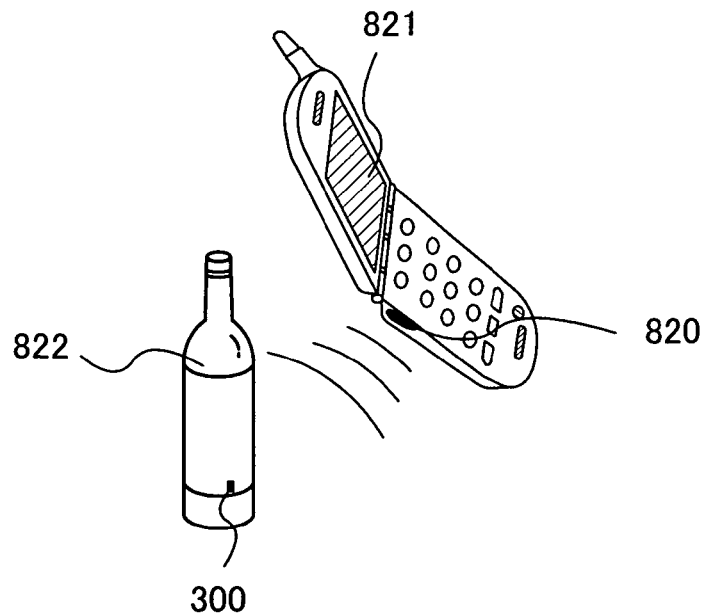
FIGS. 11A and 11B illustrate Embodiment 4 of the present invention.
Figure 11B:
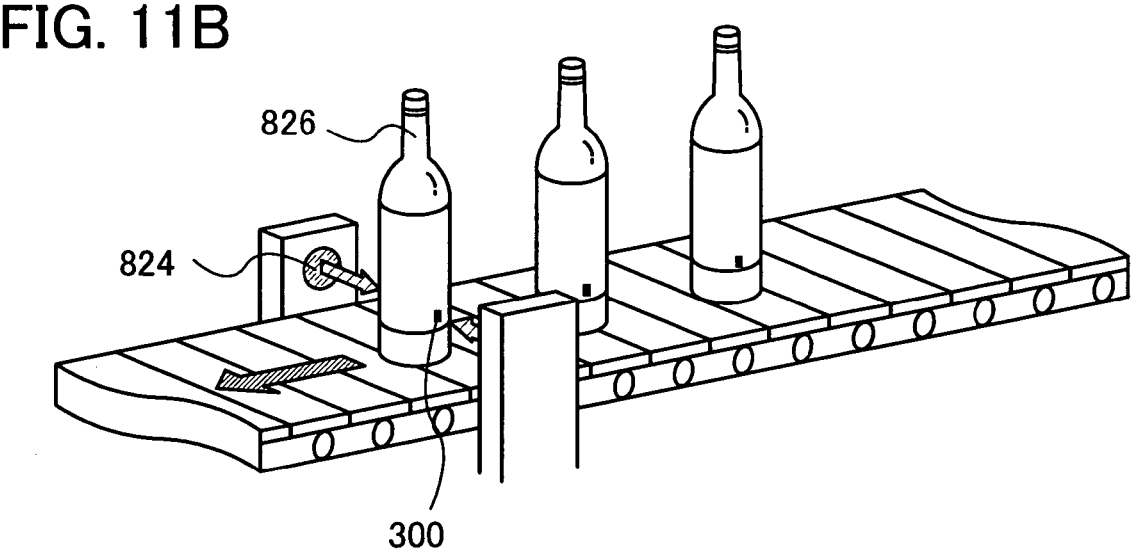
Figure 12A:
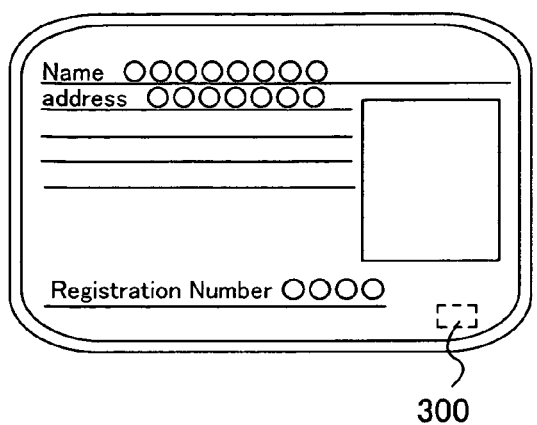
FIGS. 12A to 12E illustrate Embodiment 4 of the present invention.
Figure 12B:
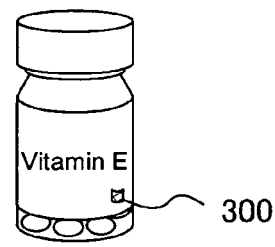
Figure 12C:
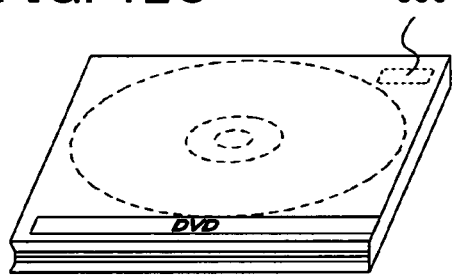
Figure 12D:
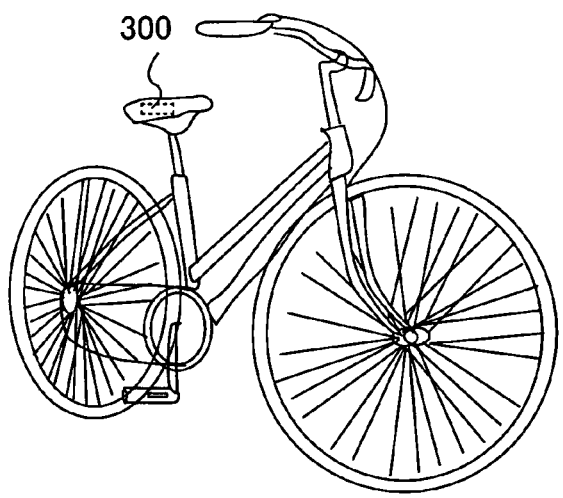
Figure 12E:
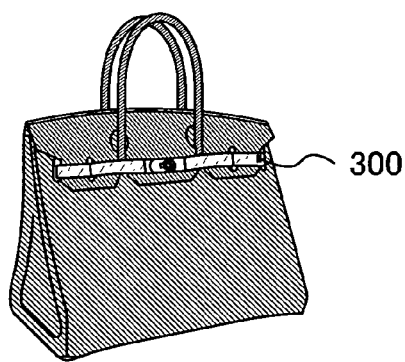

Next, one mode of a wireless communication system using the semiconductor device 201 is described with reference to FIGS. 11A and 11B. A reader/writer 820 is provided on a side of a portable terminal including a display portion 821 and the RFID tag 300 including the semiconductor device 201 is provided on a side of an object 822 (see FIG. 11A). When the reader/writer 820 is brought close to the RFID tag 300 including the semiconductor device 201 included in the object 822, information on the object 822, such as ingredients, place of origin, test result in each production step, history of the distribution process, and explanation of the object is displayed on the display portion 821. In addition, as another system, the object 826 can be inspected by using the reader/writer 824 and the RFID tag 300 including the semiconductor device 201 when the object 826 is transported by a conveyor belt (see FIG. 11B). In this manner, by utilizing the semiconductor device 201 of the present invention for a system, information can be easily obtained and a system with high performance and high added value can be provided.

This embodiment can be implemented by being combined as appropriate with the aforementioned embodiment modes and embodiments.

The present application is based on Japanese Priority Patent Application No. 2007-074085 filed on Mar. 22, 2007 with the Japan Patent Office, the entire contents of which are hereby incorporated by reference.

What is claimed is:

1. A semiconductor device, comprising:
an input circuit generating a DC voltage from an AC signal;
a circuit generating a constant voltage using the DC voltage;
a circuit portion supplied with the constant voltage;
a filter; and
a feedback circuit configured to vary an impedance of the semiconductor device in accordance with the constant voltage input through the filter and to modify intensity of an electrical current generated by the AC signal inputted into the input circuit,
wherein the filter is provided between the circuit portion and the feedback circuit.

2. The semiconductor device according to claim 1,
wherein the filter includes a first resistance element and a capacitor element,
wherein the feedback circuit includes a second resistance element and a transistor,
wherein an output of the circuit generating the constant voltage is connected to one terminal of the first resistance element, one terminal of the capacitor element and an input of the circuit portion,
wherein another terminal of the first resistance element is connected to a gate of the transistor, and
wherein one of a source and a drain of the transistor is connected to one terminal of the second resistance element.

3. The semiconductor device according to claim 1,
wherein the filter includes an inductor element and a capacitor element,
wherein the feedback circuit includes a resistance element and a transistor,
wherein an output of the circuit generating the constant voltage is connected to one terminal of the inductor element, one terminal of the capacitor element and an input of the circuit portion,
wherein another terminal of the inductor element is connected to a gate of the transistor, and
wherein one of a source and a drain of the transistor is connected to one terminal of the resistance element.

4. A semiconductor device, comprising:
an antenna, wherein the antenna is capable of data communication through wireless communication;
an input circuit generating a DC voltage from an AC signal sent from the antenna;
a circuit generating a constant voltage using the DC voltage;
a circuit portion supplied with the constant voltage;
a filter; and
a feedback circuit in which impedance varies in accordance with the constant voltage input through the filter,
wherein the filter is provided between the circuit portion and the feedback circuit,
wherein the filter includes a first resistance element and a capacitor element,
wherein the feedback circuit includes a second resistance element and a transistor,
wherein an output of the circuit generating the constant voltage is connected to one terminal of the first resistance element, one terminal of the capacitor element and an input of the circuit portion,
wherein another terminal of the first resistance element is connected to a gate of the transistor,
wherein one of a source and a drain of the transistor is connected to one terminal of the second resistance element, and wherein the other of the source and the drain of the transistor is connected to one terminal of the antenna and another terminal of the capacitor element.

5. The semiconductor device according to claim 4,
wherein the filter includes an inductor element and a capacitor element,
wherein the feedback circuit includes a resistance element and a transistor,
wherein an output of the circuit generating the constant voltage is connected to one terminal of the inductor element and one terminal of the capacitor element and an input of the circuit portion,
wherein another terminal of the inductor element is connected to a gate of the transistor,
wherein one of a source and a drain of the transistor is connected to one terminal of the resistance element, and
wherein the other of the source and the drain of the transistor is connected to one terminal of the antenna and another terminal of the capacitor element.

6. A semiconductor device comprising:
an antenna configured to receive an AC signal;
an input circuit configured to generate a DC voltage from the AC signal;
a constant voltage circuit configured to generate a constant voltage from the DC voltage;
a circuit portion supplied with the constant voltage;
a filter; and
a feedback circuit configured to change impedance of the semiconductor device in accordance with the constant voltage filtered by the filter, and to modify intensity of an electrical current generated by the AC signal inputted into the input circuit.

7. A semiconductor device according to claim 6,
wherein the filter is electrically interposed between the constant voltage circuit and the feedback circuit.

8. A semiconductor device according to claim 6,
wherein the impedance is an input impedance of the semiconductor device.

9. A semiconductor device according to claim 6,
wherein the impedance is an impedance of the semiconductor device seen by the antenna.

10. A semiconductor device according to claim 6,
wherein the filter is a low-pass filter.

11. A semiconductor device according to claim 1,
wherein the varied impedance is an impedance seen by two terminals of the semiconductor device, and
wherein the two terminals are configured to receive a signal exterior to the semiconductor device.

12. A semiconductor device according to claim 1,
wherein the varied impedance is impedance that would be seen by an exterior signal input in the semiconductor device.

13. A semiconductor device according to claim 1,
wherein the filter is a low-pass filter.

* * * * *

UNITED STATES PATENT AND TRADEMARK OFFICE
CERTIFICATE OF CORRECTION

PATENT NO. : 8,331,873 B2
APPLICATION NO. : 12/073615
DATED : December 11, 2012
INVENTOR(S) : Yutaka Shionoiri It is certified that error appears in the above-identified patent and that said Letters Patent is hereby corrected as shown below:

At column 6, line 65, "also referred to as" should be -- also referred to as $V_{IN}$). --.

Signed and Sealed this
Twelfth Day of February, 2013

Teresa Stanek Rea
*Acting Director of the United States Patent and Trademark Office*